United States Patent Office 2,742,051
Patented Apr. 17, 1956

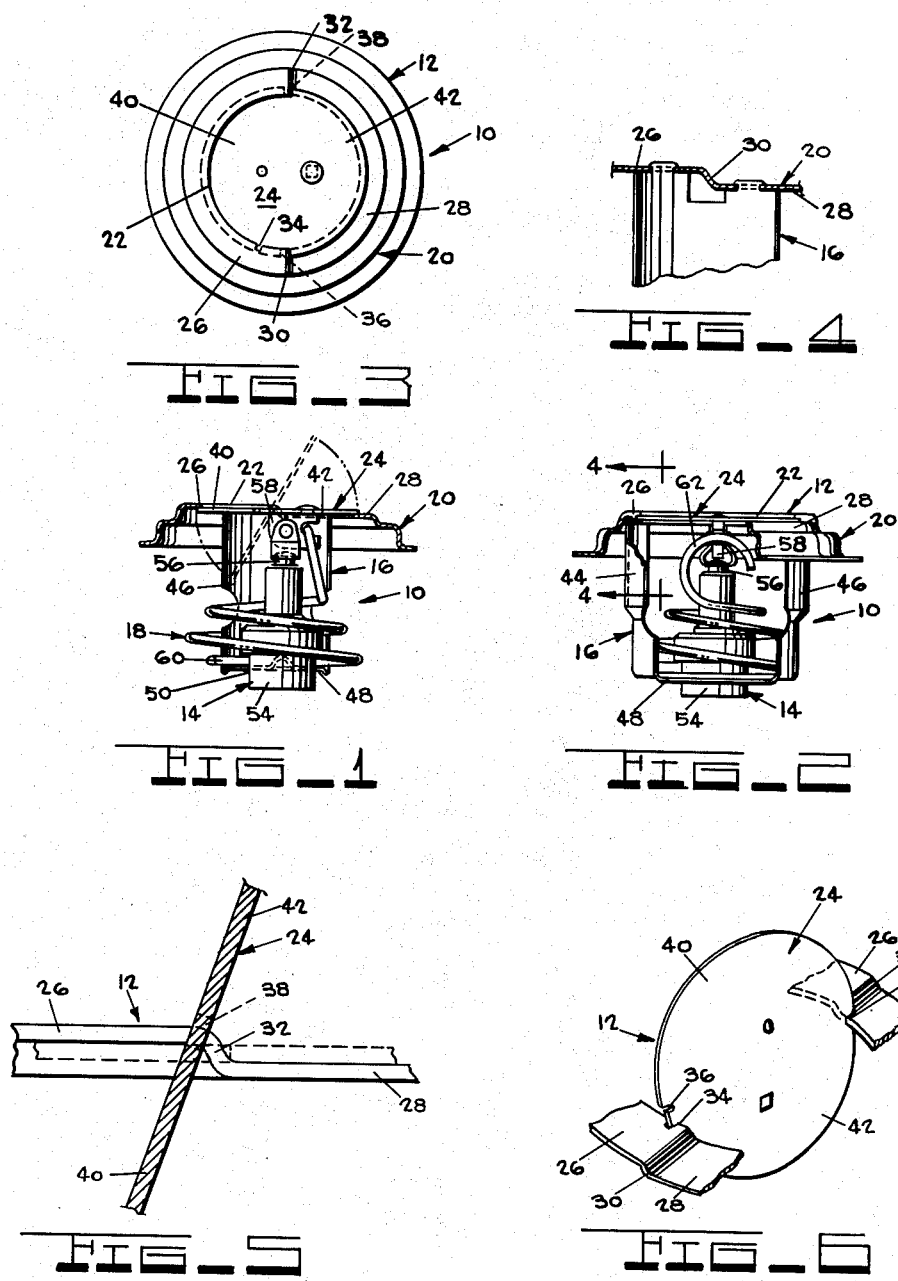

2,742,051

SHAFTLESS TYPE BUTTERFLY VALVE

Robert F. Chanda, Parma, and Reynold F. Gamundi, Mayfield Heights, Ohio, assignors to Eaton Manufacturing Company, Cleveland, Ohio, a corporation of Ohio Application March 18, 1952, Serial No. 277,148

3 Claims. (Cl. 137—315)

This invention relates to valves and more particularly to butterfly valve assemblies for utilization in engine thermostats.

Broadly the invention comprehends the provision of a butterfly valve assembly of the shaftless type for use in engine thermostat structures and the like wherein the valve is flat and adapted to have pivotal support on an intermediate section of a valve support having laterally offset oppositely disposed sections connected to the intermediate section.

Among the principal objects of the invention are the provision of a butterfly valve assembly that:

1. Is simple of construction, easy to assemble and economical to manufacture;
2. Does not require the use of shafts or the like for the pivotal support of the valve thereof;
3. Includes a flat valve having diametrically opposite notches in its periphery adapted to receive diametrically angularly offset sections of a valve support therein for the pivotal support thereof;
4. Includes a valve support having a pair of laterally offset oppositely disposed sections connected by intermediate angularly offset sections and an opening centrally thereof with the angularly offset sections diametrically opposite one another, and a flat shaftless valve appropriately pivotally supported on the angularly offset sections of the support for effecting sealing engagement with an edge of the valve opening; and
5. Includes a stamped valve and a stamped valve support having an opening therein which can be easily and readily assembled and wherein the valve can be positioned in the support for free pivotal movement and effective sealing of the opening without the use of any other elements.

Other objects and advantages of the invention will appear from the following description taken in connection with the drawings forming a part of the specification; and in which:

Fig. 1 is a vertical cross-sectional view of an engine thermostat, embodying the invention;

Fig. 2 is a vertical partly cut-away, partly cross-sectional view of the thermostat of Fig. 1, rotated 90° clockwise relative thereto;

Fig. 3 is a top elevation view of the thermostat of Figs. 1 and 2;

Fig. 4 is a fragmentary cross-sectional view taken substantially along lines 4—4 of Fig. 3;

Fig. 5 is an enlarged fragmentary partly cross-sectional view of the butterfly valve assembly of Figs. 1, 2 and 3; and Fig. 6 is an enlarged fragmentary perspective view of the valve assembly of Figs. 1, 2 and 3 in the insertion of the valve upon the support therefor.

Similar reference characters indicate corresponding parts throughout the several views of the drawings.

This invention is predicated upon the provision of a butterfly valve assembly for incorporation in an engine thermostat structure or the like which is simple and economical to manufacture. The assembly comprises two elements, a valve support having an opening centrally thereof and a valve pivotally supported on the valve support for effectively sealing the opening therethrough. The valve support is of one piece construction and includes a pair of oppositely disposed laterally offset sections connected by a pair of angularly offset sections diametrically opposite from one another, said angularly and laterally offset sections encompassing the opening. The valve is of flat plate construction and is adapted to be pivotally supported without need of shafts or the like in the angularly offset sections for controlling the opening in the valve support. In its pivotally supported position, one portion of the valve engages one axial side of one laterally offset section and another portion of the valve engages an opposite axial side of the other laterally offset section.

As applied to an engine thermostat the valve is suitably coupled to a temperature responsive element whereupon as the element is expanded the valve is pivoted about its support on the valve support to permit the passage of fluid through the opening in the valve support. Resilient means are provided normally holding the valve in sealed position over the opening and resisting movement of the temperature responsive element.

Referring to the drawings for more specific details of the invention 10 represents generally an engine thermostat comprising a valve assembly 12, a temperature responsive element 14, a cage 16 secured to the valve assembly and a coil spring 18.

The valve assembly 12 includes two elements, a valve support 20 having a circular opening 22 therethrough and a valve 24 pivotally supported on the support 20 for effectively sealing the opening when in closed position on the support, as shown by Fig. 1. The valve support 20 is of one piece, ring construction and includes a pair of like laterally offset oppositely disposed sections 26 and 28 connected by a pair of like angularly offset sections 30 and 32, diametrically opposite from one another, said angularly and laterally offset sections encompassing the opening 22.

A radial slot or notch 34 is provided in the section 26 on the edge of the opening, preferably a short distance from section 30, the purpose of which will hereinafter appear.

The valve 24 is of circular flat plate construction having a pair of diametrically opposed radial slots or notches 36 and 38 in its external periphery, such that in the assembly of the valve upon the valve support, the inner edges of the angularly offset sections are respectively received in the notches in the valve, for pivotal movement of the valve thereon. As supported on the valve support 20, a portion 40 of the valve is engageable on the under surface of laterally offset section 28, adjacent the edge of the opening 22 and another portion 42 of the valve is engageable with an upper surface of section 30, adjacent the edge of the opening 22.

It is to be noted as disclosed by several views of the drawings that the laterally offset sections lie in planes parallel to one another and are spaced apart by a distance corresponding with the thickness of the valve plate so an effective sealing of the valve on the laterally offset sections is possible.

The valve 24 is easily assembled upon the valve support 20 by the insertion of one peripheral edge of the valve in the slot 34 in the section 26 while either of the slots 36 or 38, and as shown by Fig. 6, slot 38, receives an inner edge of section 28 diametrically opposite from the slot 34 in section 26. With the slot 36 receiving the inner edge of section 28, the valve 24 is moved with its peripheral edge in slot 34 until slots 34 and 36 coincide, whereupon the valve is rotated as a unit about an axis substantially that of the opening 22, with the inner edge of section 28 in slot 36 and the inner edge of section 26 in slot 34, until the slots 36 and 38 receive respectively the offset sections 30 and 32. At this point of assembly the valve is pivotal with the angular offset sections 30 and 32 as bearing pivot supports, with the axis thereof intercepting the center of the opening 22.

The slots 36 and 38 are substantially identical and of such width sufficient to permit of the pivotal action of the valve on the bearing support sections 30 and 32 therefor without interference in swinging from full closed to full open position as shown by Fig. 1. The slots 36 and 38 are of such length that the distance between their inner periphery is slightly less than the diameter of the opening. Slot 34 is preferably of a width slightly greater than the thickness of the valve and of such length that the outer periphery thereof is preferably spaced a distance from a diametrically opposite location on the edge of the opening slightly greater than the distance from the inner peripheral edge of one slot and the outer periphery edge of the valve substantially diametrically opposite thereto.

The cage 16 includes two like axially extended leg sections 44 and 46 and an integral connecting right angular section 48, with the one free axial extremity of each leg section fixedly secured respectively to the valve support and extending axially away from the under surface thereof. An opening 50 is provided in section 48 of the cage having an axis offset slightly to the axis as the opening 22, the purpose of which will hereinafter appear.

The temperature responsive element 14 is of the general type disclosed by Patent No. 2,368,181 and includes a member 54 loosely supported on the cage with a portion thereof received in opening 50 and a piston element 56 reciprocable in member 54, swivel attached to member 58 secured to the underside of portion 40 of valve 24 slightly to one side of center of the valve. Coil spring 18 is spiral in form, arranged in encompassing relation to the element 14, and within cage 16, and has one axial extremity 60 thereof fixedly secured to section 48 of the cage and its opposite extremity in the form of a loop 62 connected to the member 58 adjacent the piston element 56 connected thereto. The spring 18 serves to tension the valve to closed position over opening 22 in valve support 20, whereas the piston element 56 upon heat expansive operation of the element 14 acts to move substantially axially and provide for pivotal movement of the valve to open position against the resistance of spring 18.

Although valve assembly 12 has been disclosed and defined specifically with relation to a specific form of thermostat structure, it is readily conceivable by any one skilled in the art as to its adaptability to any of several varied structures requiring a like valve assembly for serving a particular need and accordingly, the claims are framed in the light thereof to define of the inventive concept present.

What we claim is:

1. A valve assembly including a member having a pair of laterally offset oppositely disposed sections, a pair of oppositely disposed sections interconnecting the laterally offset sections together and an opening centrally of the sections, the edge of the opening in one of the laterally offset sections having a slot therein terminating at one end in open relation with the opening in the member, and being arranged close to one of the interconnecting sections, and a substantially circular valve of overall size larger than said opening having diametrically opposite slots in its external periphery with said slots in the valve receiving the respective interconnecting sections for pivotal support thereon, said valve being positionable for support on said member through the reception of one of said interconnecting sections in one of said slots of the valve and the reception of a diametrically opposite portion of said valve in said slot in said one laterally offset section, said valve being adapted to engage said member in a closed position of said valve relative to said member to close the opening in said member, said slot in the laterally offset section being of a width slightly larger than the thickness of said valve and a diameter across the opening between the inner periphery of one connecting section and the bottom of said slot being slightly greater than the distance from the inner peripheral edge of one slot and the outer peripheral edge of the valve substantially diametrically opposite thereto whereby the valve is assembled upon the member by the use of said slot.

2. An assembly according to claim 1 wherein the valve is in the form of a flat plate and the laterally offset sections lie in planes parallel to one another which are spaced apart a distance substantially equal to the thickness of the said circular valve.

3. An assembly according to claim 2 wherein one portion of the valve engages one of the laterally offset sections along the edge of substantially one-half of the opening on one side of the member and another portion of the valve engages the other laterally offset section along the edge of the remaining half of the opening on the opposite side of the member for a closed position of the valve.

References Cited in the file of this patent

UNITED STATES PATENTS

| | | |
|---|---|---|
| 1,346,887 | Heald | July 20, 1920 |
| 2,493,736 | Brown | Jan. 10, 1950 |
| 2,569,359 | Vellinga | Sept. 25, 1951 |